United States Patent
Nandagopal et al.

(10) Patent No.: US 8,996,707 B2
(45) Date of Patent: Mar. 31, 2015

(54) METHOD AND APPARATUS FOR PERFORMING LOAD BALANCING FOR A CONTROL PLANE OF A MOBILE COMMUNICATION NETWORK

(75) Inventors: Thyagarajan Nandagopal, Edison, NJ (US); Thomas Y. Woo, Short Hills, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1381 days.

(21) Appl. No.: 11/863,497

(22) Filed: Sep. 28, 2007

(65) Prior Publication Data
US 2009/0089793 A1   Apr. 2, 2009

(51) Int. Cl.
*G06F 15/16*   (2006.01)
*H04L 29/08*   (2006.01)
*H04L 12/701*   (2013.01)
*H04L 12/801*   (2013.01)
*H04L 12/803*   (2013.01)
(Continued)

(52) U.S. Cl.
CPC .......... *H04L 67/1008* (2013.01); *H04L 45/00* (2013.01); *H04L 47/10* (2013.01); *H04L 47/125* (2013.01); *H04L 47/14* (2013.01); *H04W 8/12* (2013.01); *H04L 67/1002* (2013.01); *H04L 67/1019* (2013.01); *H04L 67/1023* (2013.01); *H04W 80/04* (2013.01)
USPC .......... 709/229; 370/331; 370/351; 370/389; 370/400; 370/401

(58) Field of Classification Search
USPC ........................................ 709/229
See application file for complete search history.

(56) References Cited

U.S. PATENT DOCUMENTS 7,636,917 B2    12/2009  Darling et al.
2004/0003099 A1*  1/2004  House et al. .......... 709/229
(Continued)

FOREIGN PATENT DOCUMENTS

EP    1 777 908 A    4/2007
JP    2004-064619    2/2004
(Continued)

OTHER PUBLICATIONS

International Search Report & Written Opinion, PCT/US2008/010994, dated Dec. 18, 2008, Lucent Technologies Inc., Applicant, 20 pages.
(Continued)

*Primary Examiner* — Tauqir Hussain
(74) *Attorney, Agent, or Firm* — Wall & Tong LLP

(57) ABSTRACT

The invention includes a method and apparatus for providing load balancing of control traffic received by a mobility home agent implemented using multiple control elements. A method includes receiving, from a node, a control message intended for the network element, performing a load-balancing operation to select one of the control elements to handle the control message, and propagating the control message toward the selected one of the control elements. The load-balancing operation is performed using at least two load-balancing metrics comprising a first metric and a second metric. The load-balancing operation is performed in a manner for maintaining a context between the node from which the control message is received and the selected one of the control elements, such that subsequent control messages received from the node are propagated to the selected one of the control elements.

20 Claims, 4 Drawing Sheets

(51) Int. Cl.
*H04W 8/12* (2009.01)
*H04W 80/04* (2009.01)

(56) References Cited

U.S. PATENT DOCUMENTS

| | | | |
|---|---|---|---|
| 2004/0202126 A1* | 10/2004 | Leung et al. | 370/331 |
| 2005/0149531 A1* | 7/2005 | Srivastava | 707/10 |
| 2006/0106938 A1* | 5/2006 | Dini et al. | 709/228 |
| 2006/0155862 A1* | 7/2006 | Kathi et al. | 709/229 |
| 2007/0185997 A1* | 8/2007 | Stecher et al. | 709/226 |
| 2010/0257258 A1* | 10/2010 | Liu et al. | 709/220 |

FOREIGN PATENT DOCUMENTS

| | | |
|---|---|---|
| JP | 2004-096459 | 3/2004 |
| JP | 2005-025756 | 1/2005 |
| WO | WO 03/096650 A | 11/2003 |

OTHER PUBLICATIONS

Damani O P et al: "ONE-IP: techniques for hosing a service on a cluster of machines" Computer Networks and ISDN Systems, North Holland Publishing. Amsterdam, NL, vol. 29, No. 8-13, Sep. 1, 1997, pp. 1019-1027, XP004095300, ISSN: 0169-7552, the whole document.

RFC 3344, "IP Mobility Support fpr IPv4", Network Working Group, C. Perkins, Ed., Nokia Research Center, Aug. 2002, http://www.ietf.org/rfc/rfc3344.txt.

RFC 2131, "Dynamic Host Configuration Protocol," Network Working Group, R. Droms, Bucknell University, Mar. 1997, http://faqs.org/rfcs/rfc2131.html.

RFC 2865, "Remote Authentication Dial in User Service (RADIUS)," Network Working Group, C. Rigney et al., Jun. 2000, http://faqs.org/rfcs/rfc2865.html.

RFC 2882, "Network Access Servers Requirements: Extended RADIUS Practices," Network Working Group, D. Mitton, Nortel Networks, Jul. 2000, http://faqs.org/rfcs/rfc2882.html.

RFC 2869, "RADIUS Extensions," Network Working Group, C. Rigney et al., Sun Microsystems, Jun. 2000, http://www.ietf.org/rfc/rfc2869.txt.

Dec. 12, 2011 Office Action in JP Patent Application 2010-526919, Alcatel-Lucent USA Incorporated, Applicant, 3 pages.

* cited by examiner

METHOD AND APPARATUS FOR PERFORMING LOAD BALANCING FOR A CONTROL PLANE OF A MOBILE COMMUNICATION NETWORK

FIELD OF THE INVENTION

The invention relates to the field of communication networks and, more specifically, to packet routing in mobile networks.

BACKGROUND OF THE INVENTION

A packet-based network employing a mobility management protocol, e.g., Mobile IP, allows mobile node users to move between networks while maintaining a permanent IP address, thereby enabling mobile node users to maintain transport layer connections, and higher-layer connections, even as mobile node users change their point-of-connection to the packet-based network. Thus, a mobile network employing a mobility management protocol such as Mobile IP enables a MN to maintain transport and higher-layer connections with one or more host devices available on the mobile network. For a packet-based network employing Mobile IP, mobility management for mobile node users is provided using Home Agents (HAs), Foreign Agents (FAs), and other mobility management capabilities.

In a Mobile IP network, the HA is the primary entity responsible for providing mobility services to MNs. In order to support the large number of MNs typically accessing the Mobile IP network (e.g., millions of MNs, or possibly even more), a single server operating as the HA is likely to be insufficient, thereby implying a need for multiple servers operating as the HA in order to provide mobility services to the MNs. For a Mobile IP network using multiple servers operating as the HA, it is important that the load on each of the multiple servers be balanced at least to some extent in order to reduce the likelihood that any of the servers becomes overload and fails (which could potentially cause disruptions that impact service to the MNs). Disadvantageously, however, existing load balancing mechanisms do not result in proper load balancing.

SUMMARY OF THE INVENTION

Various deficiencies in the prior art are addressed through the invention of a method and apparatus for providing load balancing for control traffic received by a mobility home agent implemented using multiple control elements. A method includes receiving, from a node, a control message intended for the mobility home agent, performing a load-balancing operation to select one of the control elements to handle the control message, and propagating the control message toward the selected one of the control elements. The load-balancing operation is performed using at least two load-balancing metrics comprising a first metric and a second metric. The load-balancing operation is performed in a manner for maintaining a context between the node from which the control message is received and the selected one of the control elements, such that subsequent control messages received from the node are propagated to the selected one of the control elements.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides load balancing for control traffic received by a mobility home agent (HA) implemented using multiple control elements. The present invention uses a combination of load-balancing metrics for balancing received control messages across the multiple control elements. The load-balancing functions of the present invention are performed in a manner for maintaining a context between the node from which the control message is received and the control element initially selected to receive the control message from the node. The load-balancing metrics may include hash-based metrics, table-based metrics, load-based metrics, random metrics, and the like, as well as various combinations thereof.

Figure 1:
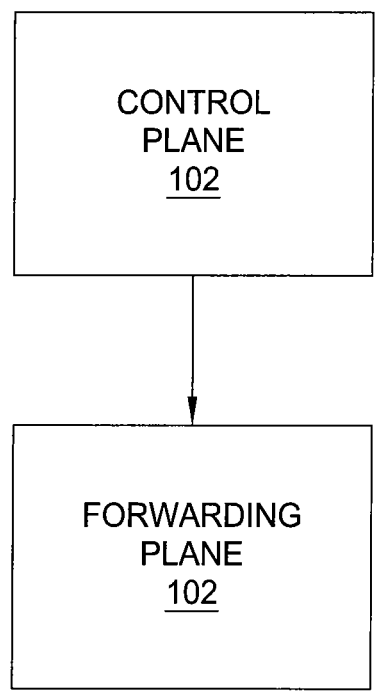
FIG. 1 depicts a high-level block diagram of a communication network.

FIG. 1 depicts a high-level block diagram of a mobile network. Specifically, mobile network 100 is implemented using a network architecture in which a forwarding plane 101 is separated from a control plane 102. The forwarding plane 101 is adapted to perform packet forwarding functions of the mobile network. The control plane 102 is adapted to perform control functions of the mobile network (e.g., handling control messaging, modifications of routing/forwarding behavior of forwarding plane 101, and the like, as well as various combinations thereof. The forwarding plane 101 and control plane 102 may be logically and/or physically separated.

For example, mobile network 100 may be implemented using multiple forwarding elements and multiple control elements. The forwarding elements include respective routing/forwarding tables adapted for use in routing/forwarding packets. The control elements are adapted for updating the routing/forwarding tables of the forwarding elements, as well as performing any other control functions which may be required in mobile network 100 (e.g., such as processing control traffic and performing other associated control functions). The forwarding elements and control elements may be logically and/or physically separated.

Figure 2:
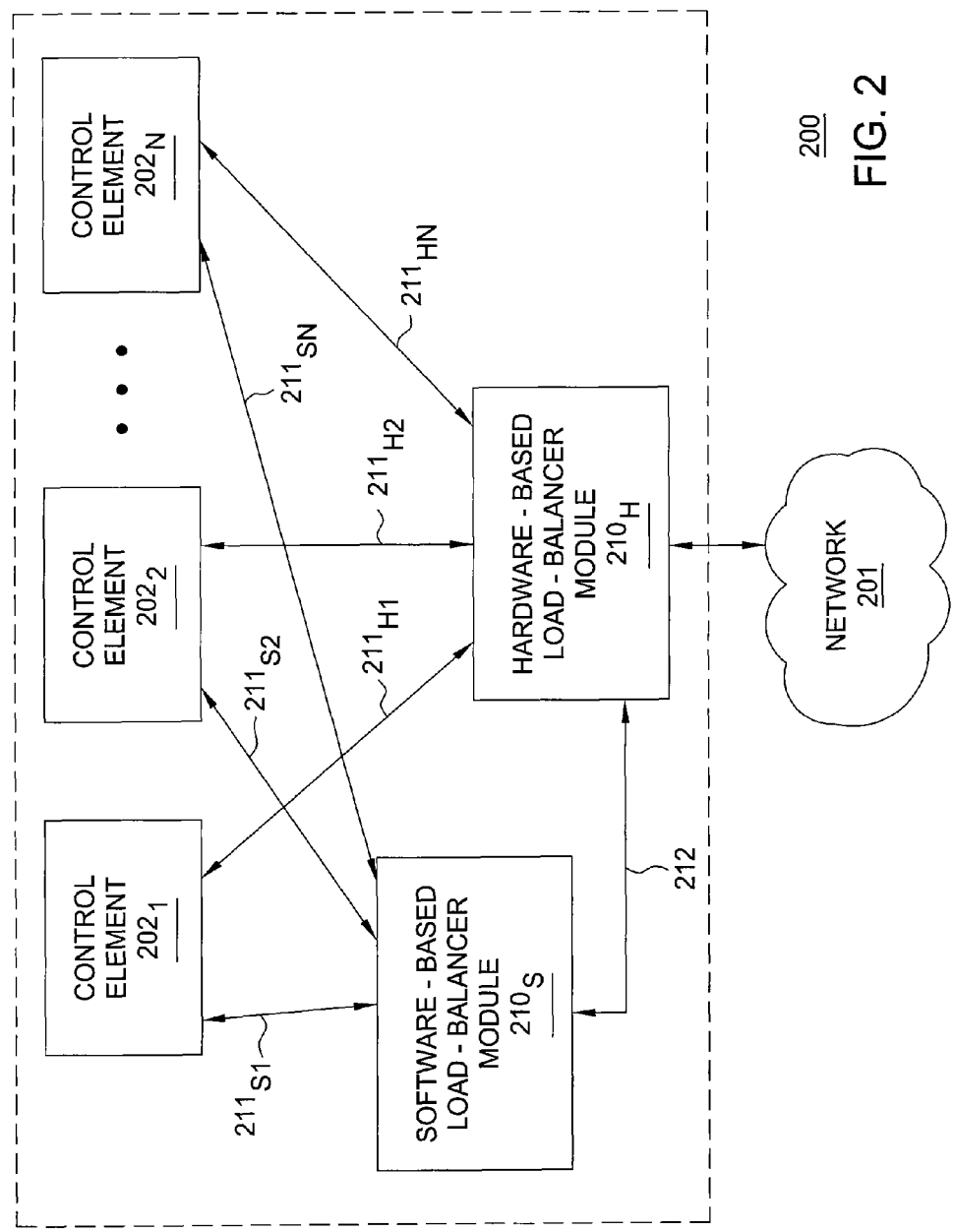
FIG. 2 depicts a high-level block diagram of the communication network of FIG. 1.

FIG. 2 depicts a high-level block diagram of a load-balancing architecture for a control plane of a mobile network. Specifically, the load-balancing architecture includes a hardware-based load-balancer module $210_H$ and a software-based load-balancer module $210_S$ (collectively, load-balancer modules 210) performing load-balancing functions for a plurality of control elements (CEs) $202_1$-$202_N$ (collectively, CEs 202). As depicted in FIG. 2, the load-balancing architecture receives control messages from other network elements of a network 201 (e.g., from mobile nodes, foreign agents, and the like). The load-balancer architecture functions to distribute control messages received from network 201 to CEs 202 such that the load of control messages is balanced across CEs 202.

The load-balancer modules 210 function to distribute control messages received from network 201 to CEs 202. The load-balancer modules 210 distribute received control messages such that the load of received control messages is balanced across CEs 202 (i.e., such that no one CE 202 becomes overloaded with control messages relative to other CEs 202). The CEs 202 may be separate servers and/or separate server blades of one or more servers. In one embodiment, each CE 202 comprises an instance of a Mobile IP Home Agent (HA) such that CEs 202, taken together, operate as one Mobile IP HA.

The hardware-based load-balancer module $210_H$ interfaces with network 201 for receiving control messages from network 201. The hardware-based load-balancer module $210_H$ interfaces with each of the CEs 202 via respective connections $211_{H1}$-$211_{HN}$ (collectively, connections $211_H$) for distributing control messages received from network 201 to CEs 202. The hardware-based load-balancer module $210_H$ also interfaces with software-based load-balancer module $210_S$ via a connection 212 for distributing control messages received from network 201 to software-based load-balancer module $210_S$ (i.e., for control messages not distributed directly to CEs 202).

The hardware-based load-balancer module $210_H$ may be implemented within the control plane and/or the forwarding plane. In one embodiment, for example, hardware-based load-balancer module $210_H$ may be implemented as an integrated module within the control plane, as a separate server blade on a control server, and the like, as well as various combinations thereof. In one embodiment, for example, hardware-based load-balancer module $210_H$ may be implemented as an integrated module within the forwarding plane.

The software-based load-balancer module $210_S$ interfaces with hardware-based load-balancer module $210_H$ via the connection 212 for receiving control messages from hardware-based load-balancer module $210_H$ (i.e., for receiving control messages not distributed directly from hardware-based load-balancer module $210_H$ to CEs 202). The software-based load-balancer module $210_S$ interfaces with each of the CEs 202 via respective connections $211_{S1}$-$211_{SN}$ (collectively, connections $211_S$) for distributing control messages received from network 201, via hardware-based load-balancer module $210_H$, to CEs 202.

The software-based load-balancer module $210_S$ may be implemented within the control plane and/or the forwarding plane. In one embodiment, for example, software-based load-balancer module $210_S$ may be implemented as an integrated module within the control plane, as a separate server blade on a control server, and the like, as well as various combinations thereof. In one embodiment, for example, software-based load-balancer module $210_S$ may be implemented as an integrated module within the forwarding plane.

As depicted in FIG. 2, hardware-based load-balancer module $210_H$ receives control messages from the forwarding plane (illustratively, from network 201). The hardware-based load-balancer module $210_H$, alone or in combination with the software-based load-balancer module $210_S$, performs a load-balancing operation on a received control message using multiple load-balancing metrics. The load-balancing operation results in selection of one of the CEs 202 to handle the received control message. The received control message is propagated (from hardware-based load-balancer module $210_H$ or software-based load-balancer module $210_S$) to the selected one of the CEs 202, which processes the control message.

In one embodiment, hardware-based load-balancer module $210_H$ only provides a received control message to software-based load-balancer module $210_S$ when hardware-based load-balancer module $210_H$ is unable to select one of the CEs 202 to which the control message should be provided. In this embodiment, if hardware-based load-balancer module $210_H$ identifies one CE 202 to which the received control message should be provided then hardware-based load-balancer module $210_H$ provides the received control message to that CE 202; however, if the hardware-based load-balancer module $210_H$ identifies zero CEs 202 to which the received control message should be provided or identifies more than one CE 202 to which the received control message should be provided, then hardware-based load-balancer module $210_H$ provides the received control message to software-based load-balancer module $210_S$ to perform an additional load-balancing operation in order to select one of the CEs 202 to which the control message should be provided.

In one embodiment, hardware-based load-balancer module $210_H$ always provides a received control message to software-based load-balancer module $210_S$. In one such embodiment, hardware-based load-balancer module $210_H$ may perform a first portion of the load-balancing operation that is adapted to select a subset of the available ones of the CEs 202, and then provides the received control message, as well as results of the first portion of the load-balancing operation, to software-based load-balancer module $210_S$. In this embodiment, software-based load-balancer module $210_S$ performs a second portion of the load-balancing operation for the received control message in order to select one of the CEs 202 (i.e., selected from the subset of available CEs 202 determined by hardware-based load-balancer module $210_H$) to which the received control message should be provided.

The load-balancing operation performed by hardware-based load-balancer module $210_H$ (and, optionally, software-based load-balancer module $210_S$) is performed using multiple load-balancing metrics. For example, for a mobility home agent, the load-balancing operation may be performed using at least two of: a domain name metric, a home IP address metric, a source address metric, a load-based metric, a random assignment metric, and the like, as well as various combinations thereof. The name/address based metrics may be applied in many ways (e.g., using one or more hash functions, using a table lookup, and the like, as well as various combinations thereof). The load-based metric may be applied using load statistics. The multiple load-balancing metrics may be applied individually (i.e., serially) or in combination.

For purposes of clarity in describing the load-balancing metrics, the load-balancing metrics are described individually. For purposes of clarity in describing different load-balancing metrics which may be applied, the load-balancing metrics are primary described herein with respect to Mobile IP signaling messages; however, since the load-balancing functions of the present invention may be applied to various other types of control messages, fewer or more (as well as different) load-balancing metrics may be available for use in performing load-balancing for received control messages. A description of some possible load-balancing metrics follows.

In one embodiment, load balancing may be performed using a domain name metric (i.e., using a domain name included in the received control message). The domain name metric may be applied in many ways (e.g., using one or more hash functions, using a table lookup, and the like, as well as various combinations thereof). In one embodiment, a hash function may be applied to the domain name included in the received control message. The hash function may be applied to the domain name alone, or may be applied to a combination of the domain name and one or more other parameters included in the received control message. In one embodiment, a table lookup may be performed using the domain name included in the received control message.

In one embodiment, load balancing may be performed using a home IP address metric (i.e., using a home IP address included in the received control message). The home IP address metric may be applied in many ways (e.g., using one or more hash functions, using a table lookup, and the like, as well as various combinations thereof). In one embodiment, a hash function may be applied to the home IP address, or a portion of the home IP address. The hash function may be applied to the home IP address alone, or may be applied to a combination of the home IP address and one or more other parameters included in the received control message. In one embodiment, a table lookup (e.g., a prefix-based lookup, a range-based lookup, and the like, as well as various combinations thereof) may be performed using the home IP address included in the received control message.

In one embodiment, load balancing may be performed using a source address metric (i.e., using a source address included in the received control message). The source address may include a Care-Of (CO) address, a Foreign Agent (FA) address, or any other similar address. The source address metric may be applied in many ways (e.g., using one or more hash functions, using a table lookup, and the like, as well as various combinations thereof). In one embodiment, a hash function may be applied to the source address. The hash function may be applied to the source address alone, or may be applied to a combination of the source address and one or more other parameters included in the received control message. In one embodiment, a table lookup may be performed using the source address included in the received control message.

In one embodiment, load balancing may be performed using a source address metric indicative of the load associated with each of the CEs 202. In one embodiment, load information for CEs 202 may be provided from CEs 202 to one or both of the load-balancer modules 210. In this embodiment, the load information for CEs 202 may be provided to load-balancer module(s) 210 with any frequency (e.g., once each microsecond, once per second, and the like). In another embodiment, the load information for CEs 202 may be tracked by load-balancer modules 210 (e.g., using some exchange of control information between load-balancer modules 210).

In an embodiment, in which load-balancing is performed based on a load-based metric indicative of the load associated with each of the CEs 202, the load-based metric may be applied in a number of different ways. In one embodiment, for example, a received control message may be directed to the least loaded CE 202. In another embodiment, for example, a received control message may be directed to the next-to-least most loaded CE 202. The load-based metric may be applied in various other ways. In one embodiment, in which load-balancing is performed based on a load-based metric, the load-based metric may only be applied after other available metrics are applied.

In one embodiment, load-balancing may be performed using a random assignment metric. In one such embodiment, the random assignment metric may use a combination of at least two of the domain name, the home IP address, and the source address (e.g., an FA address and/or a CO address). The random assignment metric may be applied in many ways (e.g., using one or more hash functions, one or more table lookups, and/or one or more rules, and the like, as well as various combinations thereof). The random assignment metric may be applied individually or in conjunction with one or more other load-balancing metrics for directing a received control message to one of the CEs 202.

As described herein, although specific load-balancing metrics are described individually, a load-balancing operation according to the present invention utilizes multiple such load-balancing metrics in order to select the control element to which a received control message is forwarded. As described herein, the multiple load-balancing metrics may be applied individually (i.e., serially) and/or in combination. In other words, multiple load-balancing metrics may be applied in any combination of serial applications of individual and/or multiple metrics and/or combinatorial applications of individual and/or multiple metrics.

In one embodiment, multiple load-balancing metrics may be applied serially by hardware-based load-balancer module $210_H$. In one embodiment, multiple load-balancing metrics may be applied serially by software-based load-balancer module $210_S$. In one embodiment, multiple load-balancing metrics may be applied serially by both hardware-based load-balancer module $210_H$ and software-based load-balancer module $210_S$ (e.g., one or more by hardware-based load-balancer module $210_H$ and one or more by software-based load-balancer module $210_S$). In one embodiment, multiple load-balancing metrics may be applied in combination by hardware-based load-balancer module $210_H$. In one embodiment, multiple load-balancing metrics may be applied in combination by software-based load-balancer module $210_S$.

In one embodiment, combinations of such operations may be performed. In one embodiment, for example, one or more load-balancing metrics may be applied serially by hardware-based load-balancer module $210_H$ and then multiple load-balancing metrics may be applied in combination by software-based load-balancer module $210_S$. In one embodiment, for example, multiple load-balancing metrics may be applied in combination by hardware-based load-balancer module $210_H$ and then multiple load-balancing metrics may be applied serially by software-based load-balancer module $210_S$. In one embodiment, for example, multiple load-balancing metrics may be applied in combination by hardware-based load-balancer module $210_H$ and then multiple load-balancing metrics may be applied in combination by software-based load-balancer module $210_S$ (i.e., a serial application of different combinations of metrics).

As described herein, each of the load-balancing metrics may be applied (i.e., used in performing the load-balancing operation for a received control message) in many ways (which may depend on the type of load-balancing metric being applied). For example, the different load-balancing metrics may be applied using hash functions, table lookups, metric-specific operations, and the like, as well as various combinations thereof. In one embodiment, hash functions are performed by hardware-based load-balancer module $210_H$ and table-based look-ups and other metric-based operations are performed by software-based load-balancer module $210_S$.

The use of multiple load-balancing metrics in performing a load-balancing operation (e.g., serially and/or in combination) may be better understood with respect to the following examples.

As one example, upon receiving a control message, hardware-based load-balancer module $210_H$ may apply a hash function using a combination of the domain name, CO address, and home IP address included in the control message. In this example, the result of the hash function may result in selection of one of the N available CEs 202 (e.g., CE 202$_2$). In this example, the hardware-based load-balancer module $210_H$ then forwards the control message to directly to the selected CE 202$_2$ (i.e., in this example, the control message is not forwarded to software-based load-balancer module $210_S$; rather the control message is distributed directly from the hardware-based load-balancer module $210_H$ to the selected CE 202$_2$.

As another example, upon receiving a control message, hardware-based load-balancer module $210_H$ may apply a hash function using the domain name included in the control message. In this example, the result of the hash function may result in selection of three of the N available CEs 202 (e.g., CE $202_1$, CE $202_2$, and CE $202_3$). The hardware-based load-balancer module $210_H$ may then forward the control message to software-based load-balancer module $210_S$. In this example, software-based load-balancer module $210_H$ may then select CE $202_1$, CE $202_2$, or CE $202_3$ for the received control message using one or more additional load-balancing metrics (e.g., performing a table look-up based on FA address, using a load-based metric, using a random assignment metric, and the like, as well as various combinations thereof. The software-based load-balancer module $210_H$ then propagates the received control message to the selected one of the CEs $202_1$, $202_2$, or $202_3$.

As another example, upon receiving a control message, hardware-based load-balancer module $210_H$ may apply a hash function using a combination of the domain name and home IP address included in the control message. In this example, the result of the hash function may result in selection of two of the N available CEs 202 (e.g., CE $202_2$ and CE $202_3$). The hardware-based load-balancer module $210_H$ may then forward the control message to software-based load-balancer module $210_S$. In this example, the software-based load-balancer module $210_H$ may then select either CE $202_2$ and CE $202_3$ for the received control message using a load-based metric (e.g., providing the control message to whichever of CE $202_2$ and CE $202_3$ has the lower current message load).

As another example, upon receiving a control message, hardware-based load-balancer module $210_H$ may apply a hash function using the domain name included in the control message. In this example, the hash function on the domain name may be applied such that all control messages from a particular domain name (e.g., "alcatel-lucent.com") are directed to one of two possible CEs (e.g., CE $202_2$ and CE $202_3$). In this example, either the hardware-based load-balancer module $210_H$ or the software-based load-balancer module $210_S$ may then apply one or more additional load-balancing metrics (e.g., a load-based metric, a random assignment metric, and the like) in order to select the one of the two CEs 202 to which the received control message is distributed.

The above-described examples are for illustrative purposes only and, thus, the present invention is not limited by such examples. The load-balancing metrics described herein may be used in various other ways. The load-balancing metrics described herein may be used in various other combinations. Furthermore, various other similar load-balancing metrics may be used for distributing control messages across multiple control elements in a manner for preventing any of the control elements from becoming overloaded. The load-balancing functions of the present invention may be better understood with respect to FIG. 3.

Figure 3:
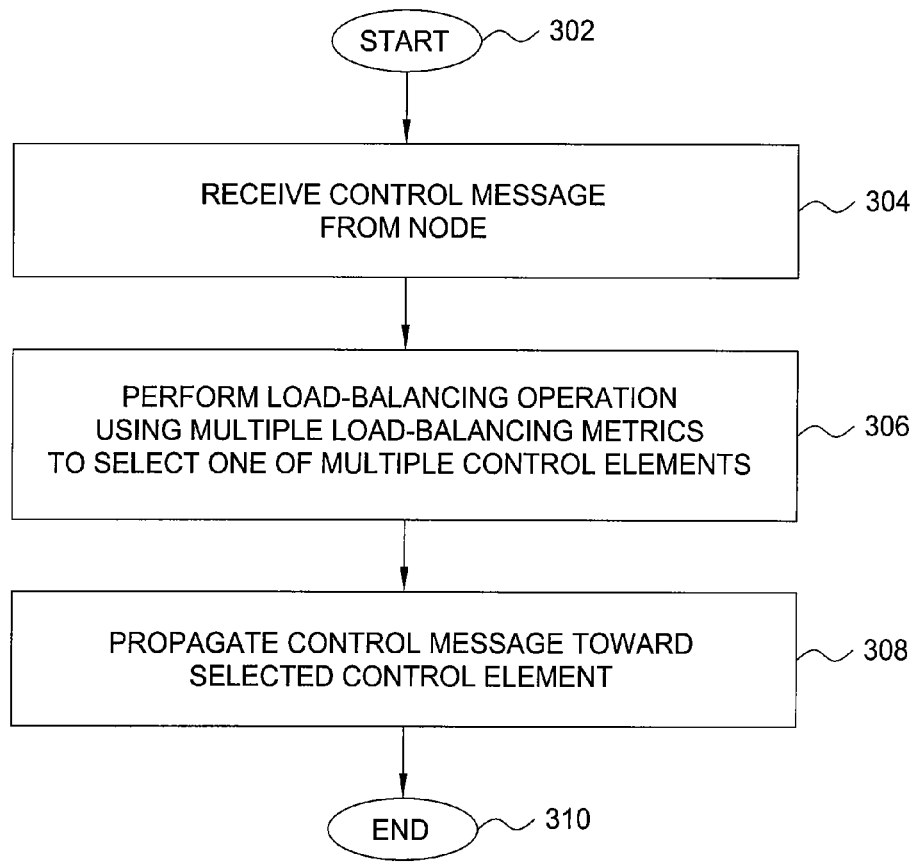
FIG. 3 depicts a method according to one embodiment of the present invention.

FIG. 3 depicts a method according to one embodiment of the present invention. Specifically, method 300 of FIG. 3 includes a method for performing load balancing of control messages across control elements of a network element. Although depicted and described as being performed serially, at least a portion of the steps of method 300 of FIG. 3 may be performed contemporaneously, or in a different order than depicted and described with respect to FIG. 3. The method 300 begins at step 302 and proceeds to step 304.

At step 304, a control message is received. At step 306, a load-balancing operation is performed to select one of the control elements to handle the received control message. The load-balancing operation is performed using at least two load-balancing metrics. The load-balancing metrics may be applied serially and/or in combination by a hardware module and, optionally, also a software module. At step 308, the control message is propagated toward the selected control element, which processes the received control element. At step 310, method 300 ends.

Although primarily depicted and described herein with respect to using Mobile IP as the mobility management protocol, the present invention may be used in conjunction with other mobility management protocols. For example, the present invention may be used in conjunction with mobility management protocols such as Hierarchical Mobile IPv6 (HMIPv6), Interactive Protocol for Mobile Networking (IPMN), and the like, as well as various combinations thereof. Although primarily depicted and described herein with respect to embodiments in which a home address is a network-layer address (e.g., IP address), in other embodiments, the addresses assigned to the mobile node may be assigned at different layers of the communication hierarchy.

The control messages may include any control messages which may be propagates within a mobile network. For example, the control messages may include: (1) Mobile IP signaling messages, (2) Authentication, Authorization, and Accounting (AAA) service messages (e.g., RADIUS signaling messages, DIAMETER signaling messages, and the like), (3) address assignment messages (e.g., DHCP signaling messages), and the like, as well as various combinations thereof. Thus, although the load-balancing metrics are primary described with respect to Mobile IP signaling messages, the present invention is not limited to providing load-balancing functions for Mobile IP signaling messages.

In addition to the load-balancing functions depicted and described herein, the load-balancer modules 210, alone or in combination, may also perform other functions.

In one embodiment, load-balancer modules 210 may perform packet payload processing. In one such embodiment, for example, load-balancer modules 210 may perform packet payload inspection (e.g., beyond the network and transport protocol headers), such as searching for specific values within packet payloads, processing packets according to information identified in packet payloads, and the like, as well as various combinations thereof.

In one embodiment, load-balancer modules 210 may perform Network Address Translation (NAT) functions. In one embodiment, for example, load-balancer modules 210 may be used to support messages exchanged between DHCP clients and DHCP servers. In one such embodiment, the DHCP clients may be part of the control elements, or separate entities co-located with the control elements. In this embodiment, each of the control elements (clients) may have an internal IP address that is different than the IP address assigned for the Mobile IP HAs of the control elements; however, these internal IP addresses must be invisible to the external DHCP servers (i.e., only the IP addresses of the Mobile IP HAs are visible to the DHCP server. The NAT functions of the load-balancer modules 210 (i.e., address/port translations) handle outgoing DHCP client packets and re-direct incoming DHCP server packets to the correct control elements (DHCP clients).

Figure 4:
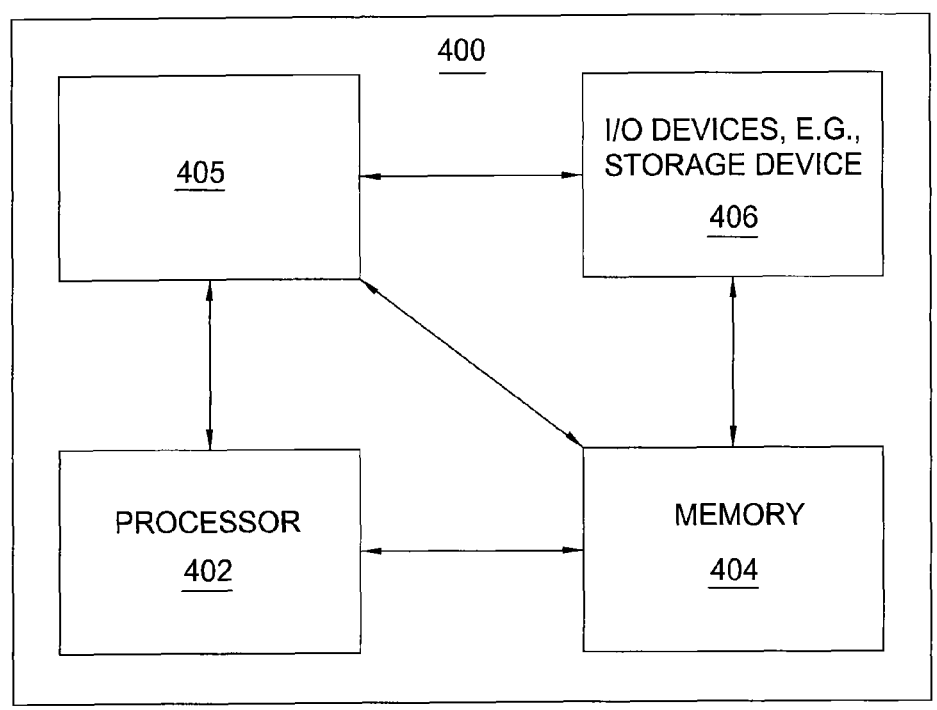
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, system 400 comprises a processor element 402 (e.g., a CPU), a memory 404, e.g., random access memory (RAM) and/or read only memory (ROM), a load-balancing module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present load-balancing process 405 can be loaded into memory 404 and executed by processor 402 to implement the functions as discussed above. As such, load-balancing process 405 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for providing load balancing for control traffic received at a mobility home agent comprising a set of multiple control elements, the method comprising:
    receiving, at a first load-balancer module of the mobility home agent, a control message intended for the mobility home agent;
    performing a first load-balancing operation for the control message at the first load-balancer module based on a first load-balancing metric, wherein the first load-balancing operation results in selection of a selected subset of control elements from the set of multiple control elements; and
    propagating, from the first load-balancer module toward a second load-balancer module of the mobility home agent, the control message and information indicative of the selected subset of control elements, wherein the second load-balancer module is configured to perform a second load-balancing operation for the control message based on a second load-balancing metric for selecting one of the control elements from the selected subset of control elements and is configured to propagate the control message toward the selected one of the control elements.

2. The method of claim 1, wherein the control message is associated with a node, wherein load balancing for the control message is performed in a manner for maintaining a context between the node and the selected one the control elements.

3. The method of claim 2, wherein the context between the node and the selected one the control elements is adapted to ensure that subsequent control messages received from the node are propagated to the selected one of the control elements.

4. The method of claim 1, wherein the control message is received at the first load-balancer module from a forwarding element associated with the control element.

5. The method of claim 1, wherein the first load-balancer module is a hardware-based load-balancer module.

6. The method of claim 1, wherein the second load-balancer module is a software-based load-balancer module.

7. The method of claim 6, wherein at least one of the first load-balancing operation and the second load-balancing operation is performed using a plurality of load-balancing metrics.

8. The method of claim 1, wherein at least one of the first load-balancing operation and the second load-balancing operation is performed using at least one of a hash operation, a table look-up operation, a load-based operation, and a random selection operation.

9. The method of claim 1, wherein at least one of the first load-balancing operation and the second load-balancing operation is performed using at least one of a domain name, a home Internet Protocol (IP) address, a source address, a load-based metric, and a random assignment metric.

10. A non-transitory computer-readable storage medium storing instructions, that, when executed by a computer, cause the computer to perform a method for providing load balancing for control traffic received at a mobility home agent comprising a set of multiple control elements, the method comprising:
    receiving, at a first load-balancer module of the mobility home agent, a control message intended for the mobility home agent;
    performing a first load-balancing operation for the control message at the first load-balancer module based on a first load-balancing metric, wherein the first load-balancing operation results in selection of a selected subset of control elements from the set of multiple control elements; and
    propagating, from the first load-balancer module toward a second load-balancer module of the mobility home agent, the control message and information indicative of the selected subset of control elements, wherein the second load-balancer module is configured to perform a second load-balancing operation for the control message based on a second load-balancing metric for selecting one of the control elements from the selected subset of control elements and is configured to propagate the control message toward the selected one of the control elements.

11. The non-transitory computer-readable storage medium of claim 10, wherein the control message is associated with a node, wherein load balancing for the control message is performed in a manner for maintaining a context between the node and the selected one the control elements.

12. The non-transitory computer-readable storage medium of claim 11, wherein the context between the node and the selected one the control elements is adapted to ensure that subsequent control messages received from the node are propagated to the selected one of the control elements.

13. The non-transitory computer-readable storage medium of claim 10, wherein the control message is received at the first load-balancer module from a forwarding element associated with the control element.

14. The non-transitory computer-readable storage medium of claim 10, wherein the first load-balancer module is a hardware-based load-balancer module.

15. The non-transitory computer-readable storage medium of claim 10, wherein the second load-balancer module is a software-based load-balancer module.

16. The non-transitory computer-readable storage medium of claim 15, wherein at least one of the first load-balancing operation and the second load-balancing operation is performed using a plurality of load-balancing metrics.

17. The non-transitory computer-readable storage medium of claim 10, wherein at least one of the first load-balancing operation and the second load-balancing operation is performed using at least one of a hash operation, a table look-up operation, a load-based operation, and a random selection operation.

18. The non-transitory computer-readable storage medium of claim 10, wherein at least one of the first load-balancing operation and the second load-balancing operation is performed using at least one of a domain name, a home Internet Protocol (IP) address, a source address, a load-based metric, and a random assignment metric.

19. An apparatus for providing load balancing for control traffic received at a mobility home agent comprising a set of multiple control elements, the apparatus comprising:
- a processor and a memory communicatively connected to the processor, the processor configured to:
  - receive, at a first load-balancer module of the mobility home agent, a control message intended for the mobility home agent;
  - perform a first load-balancing operation for the control message at the first load-balancer module based on a first load-balancing metric, wherein the first load-balancing operation results in selection of a selected subset of control elements from the set of multiple control elements; and
  - propagate, from the first load-balancer module toward a second load-balancer module of the mobility home agent, the control message and information indicative of the selected subset of control elements, wherein the second load-balancer module is configured to perform a second load-balancing operation for the control message based on a second load-balancing metric for selecting one of the control elements from the selected subset of control elements and is configured to propagate the control message toward the selected one of the control elements.

20. An apparatus for providing load balancing for control traffic received at a mobility home agent comprising a set of multiple control elements, the apparatus comprising:
- a first load-balancer module and a second load-balancer module, at least one of the first load-balancer module and the second load-balancer module comprising a processor and a memory, wherein:
  - the first load-balancer module is configured to:
    - receive a control message intended for the mobility home agent;
    - perform a first load-balancing operation for the control message based on a first load-balancing metric, wherein the first load-balancing operation results in selection of a selected subset of control elements from the set of multiple control elements; and
    - propagate, from the first load-balancer module toward the second load-balancer module, the control message and information indicative of the selected subset of control elements; and
  - the second load-balancer module is configured to:
    - receive, from the first load-balancer module, the control message and the information indicative of the selected subset of control elements;
    - perform a second load-balancing operation for the control message based on a second load-balancing metric for selecting one of the control elements from the selected subset of control elements; and
    - propagate the control message toward the selected one of the control elements.

* * * * *